(12) United States Patent
Vernica

(10) Patent No.: US 11,221,255 B2
(45) Date of Patent: Jan. 11, 2022

(54) STORING SPECTROSCOPY DATA IN LAYERS

(71) Applicant: Hewlett-Packard Development Company, L.P., Spring, TX (US)

(72) Inventor: Rares Vernica, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/970,663

(22) PCT Filed: Apr. 18, 2018

(86) PCT No.: PCT/US2018/028095
§ 371 (c)(1),
(2) Date: Aug. 18, 2020

(87) PCT Pub. No.: WO2019/203815
PCT Pub. Date: Oct. 24, 2019

(65) Prior Publication Data
US 2021/0096024 A1 Apr. 1, 2021

(51) Int. Cl.
*G01J 3/02* (2006.01)
*G01J 3/44* (2006.01)
*G06F 3/0489* (2013.01)

(52) U.S. Cl.
CPC .............. *G01J 3/027* (2013.01); *G01J 3/0264* (2013.01); *G01J 3/0275* (2013.01); *G01J 3/44* (2013.01); *G06F 3/04892* (2013.01)

(58) Field of Classification Search
CPC ...... G01J 3/02; G01J 3/00; G01J 3/027; G01J 3/0264; G01J 3/0275; G01J 3/44; G06F 3/04892; G06F 3/033
See application file for complete search history.

(56) References Cited

U.S. PATENT DOCUMENTS

| | | | |
|---|---|---|---|
| 5,272,089 A | 12/1993 | Vo-Dinh | |
| 7,436,510 B2 | 10/2008 | Grun et al. | |
| 7,660,678 B2 | 2/2010 | Odegard et al. | |
| 8,107,068 B2 | 1/2012 | Chen et al. | |
| 8,688,384 B2 | 4/2014 | Puppels et al. | |
| 9,562,848 B2 | 2/2017 | Goldring et al. | |
| 2003/0195899 A1* | 10/2003 | Tsao | G06F 16/289 |
| 2009/0001262 A1 | 1/2009 | Visser et al. | |
| 2012/0089652 A1 | 4/2012 | Ganeshalingam et al. | |
| 2013/0182895 A1 | 7/2013 | Touzov et al. | |
| 2014/0133729 A1 | 5/2014 | Goshen | |
| 2016/0109295 A1 | 4/2016 | Wang | |
| 2017/0153142 A1 | 6/2017 | Rosen et al. | |

* cited by examiner

*Primary Examiner* — Abdullahi Nur
(74) *Attorney, Agent, or Firm* — Thorpe North & Western LLP

(57) ABSTRACT

The present disclosure relates to storing spectroscopy data in layers, including a system having a sensor to generate raw spectroscopy data for an object, a processor to process the raw spectroscopy data in stages to generate multi-stage data using intermediate data at individual stages, and a database to store the intermediate data for individual stages as a multi-dimensional array in an array data model.

15 Claims, 3 Drawing Sheets

STORING SPECTROSCOPY DATA IN LAYERS

BACKGROUND

Data can be collected from an instrument such as a spectrometer. For example, a spectrometer may be an instrument that measures the wavelength of light or other electromagnetic information generated from a sample. Information about the light being measured may be stored as data at a storage location, such as a database, e.g., a relational database or other types of databases. Access to the data that is stored can occur in a variety of ways.

DETAILED DESCRIPTION

Figure 1:
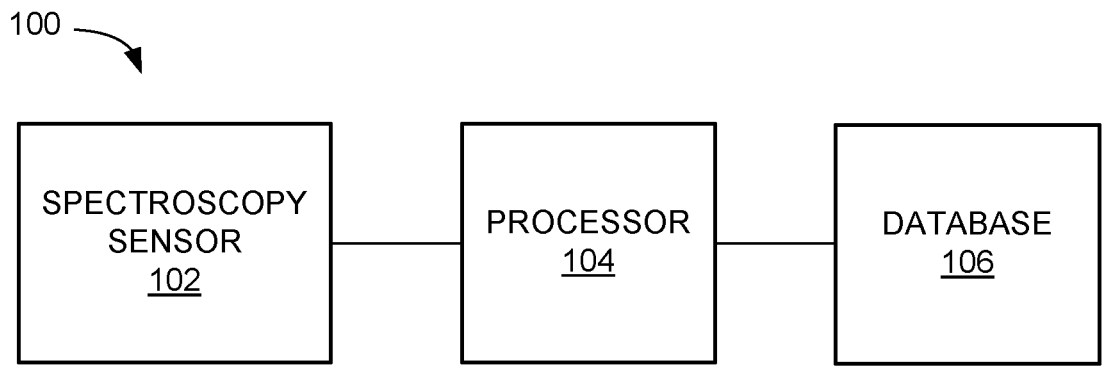
FIG. 1 is a block diagram of an example system for storing spectroscopy data in layers in accordance with the present disclosure.

Storing spectroscopy data in layers can be carried out using a system, method, or a non-transitory machine-readable storage medium having instructions embodied thereon. In one example, a system to store spectroscopy data in layers can include a sensor to generate raw spectroscopy data from an object, a processor to process the raw spectroscopy data in stages to generate multi-stage data using intermediate data at individual stages, and a database to store the intermediate data for individual stages as a multi-dimensional array in an array data model. The array data model can also store the unprocessed or raw spectroscopy data. In one example, the sensor can be a spectrometer and the raw spectroscopy data is generated using luminescence-enhanced spectroscopy. The data stored in the array data model can be made available via an application programming interface (API), for example. In further detail, dimensions of the multi-dimensional array can include acquisition data, sensor data, index data, and layer data. The array data model can be scalable and/or can store data from a plurality of sensors.

In another example, a method for storing spectroscopy data in layers can include receiving raw spectroscopy data regarding an object generated by a sensor, processing the raw spectroscopy data in stages to generate multi-stage data using intermediate data at individual stages, and storing the intermediate data for individual stages as a multi-dimensional array in an array data model associated with a database. In one example, the sensor can be a spectrometer and the raw spectroscopy data is generated using luminescence-enhanced spectroscopy. The data stored in the array data model can be made available via an application programming interface (API), for example. In further detail, dimensions of the multi-dimensional array can include acquisition data, sensor data, index data, and layer data. The array data model can be scalable and/or can store data from a plurality of sensors.

In another example, a non-transitory machine-readable storage medium having instructions embodied thereon can be prepared so that when executed, a processor stores spectroscopy data in layers. The storage medium can include instructions related to receiving raw spectroscopy data regarding an object generated by a sensor, processing the raw spectroscopy data in stages to generate multi-stage data using intermediate data at individual stages, and storing the intermediate data for individual stages as a multi-dimensional array in an array data model associated with a database. In one example, the data stored in the array data model can be made available via an application programming interface (API), and in another example, dimensions of the multi-dimensional array can include acquisition data, sensor data, index data, and layer data.

As a preliminary note, the term "sensor" can be used herein to describe any device or system that can generate spectroscopy data, including a surface-enhanced Raman spectroscopy (SERS) device, a surface-enhanced fluorescence (SEF) device, etc. Furthermore, these instruments can include multiple individual components that may also be considered "sensors," including electromagnetic energy detectors that detect reflected or other energy generated at a surface of an object or target, or even the object or target per se may be considered to be a "sensor" in isolation because the object or target may be reconfigurable or otherwise sensitive to exposure to a fluid or other sample. That being stated, in the context of the present disclosure, the term "sensor" is used more generally to include any specific device or any system of devices that can provide spectroscopy data to be stored in layers in accordance with examples of the present disclosure.

Thus, a sensor or instrument, such as a spectrometer or component thereof, can generate raw data related to an object or target. The raw data can then be processed in multiple stages including intermediate stages that individually generate data. The raw data and the intermediate data may be data related to light including the wavelength and/or intensity of the light and/or other electromagnetic properties that may be generated from exposing an object or target to electromagnetic radiation, for example. The raw data and the intermediate data may then be stored in a database in layers or a multi-dimensional array in an array data model.

In one example, the sensor or spectrometer can be based a luminescence-enhanced spectroscopy, such as SERS, SEF, or the like. SERS is a surface-sensitive technique that enhances Raman scattering by molecules adsorbed on rough metal surfaces or by nanostructures such as plasmonic-magnetic silica nanotubes or other structures, and in some instances included objects that have a gold or other metal coating. SERS techniques may be used to identify an object or target by receiving light reflected from a surface of the object, or by some other electromagnetic radiation induced energy that may be readable by a detector. SERS may even be used to detect single molecules. SEF occurs when a fluorophore is placed near the high electromagnetic fields at the surface of a plasmonic metal nanoparticle, enhancing the fluorophore emission intensity by orders of magnitude. Whether SERS or SEF or some other type of spectroscopy data is collected, the storage techniques of the present disclosure can be implemented. By way of definition, data generated by SERS techniques may be referred to as a "SERS data," and data generated by SEF techniques may be referred to as "SEF data." More generically, both types of data can be collectively referred to as "luminescence-enhanced data."

Using luminescence-enhanced data for example purposes, data analysis may be performed in multiple stages. Initial stages may process raw data obtained from the instrument while later stages process intermediate data produced by the initial stages. This multi-stage data processing environment stores intermediate data at the various stages. Individual data stages may have an implicit link to the data of the previous stage (used as input), ultimately linking back to the raw data. The multi-dimensional array can be capable of storing the data from the various stages of the processing while the implicit data links between the stages can be maintained and stored.

The array data model may be referred to as an array data structure or an array. The array data model may be a data structure including a collection of elements (values or variables), identified by at least one array index or key. The array data model may be stored so that the position of an element can be computed from its index tuple or index vector by a mathematical formula. An array data model with more than one element or dimension may be referred to as a multi-dimensional array. For example, a multi-dimensional array with acquisition data, sensor data, index data, and layer data may be described as a four-dimensional array. The multi-dimensional array may include additional dimensions with data related to a wafer or wafer type for an instrument such as a spectrometer, a sensor or detector location on the wafer, a sensor location on a spectrometer tray, a spectrometer or spectrometer type, an analyte, or a reagent. Individual arrays may have one or more dimensions that are finite or infinite. Individual cells in the array can contain one or more attributes. Data elements can be defined as slices in one or more multi-dimensional arrays. The array data model may store data from a plurality of sensors. The array data model can be scalable to allow for exponential increases of data to be stored.

Using the array data model with multi-dimensions can be capable of storing accessing data faster compared to other techniques such as a relational database. For example, a relational database may be a MySQL or Oracle database. A relational database may organize data such that one cell comes after another and the first cell is found first. The array data model allows the data to be stored in dimensions that may be accessed independently. For example, data stored in layers in the array data model allows a specific layer of data to be accessed or allows access to slice across layers. The dimensions may also be layered so that additional data may be added as a new layer.

Applications, including software applications, may be built upon the array data model that stores the data including the raw data from the sensor and the intermediate data generated by processing the raw data. An application built upon the array data model may be described as an upstream application. The array data model with faster read and write speeds compared to a relational database or other data structure allows an upstream application to be more responsive and offer a better experience to the user of the upstream application. The faster read and write speeds also allow more features to the added to the upstream application.

The array data model allows an application developer to access data stored in the array data model in unique ways compared to data stored in a relational database. For example, the data stored in the array data model may be accessed via an Application Programming Interface (API). The data access pattern and structure offered by the array data model or the layered data storage model is beneficial. Specifically, the API allows straight forward access to the data in the array data model at one layer or at a slice of layers. In other words, the API gives control to a developer as to which data is accessed by an application being developed. This can simplify the application development, which results in applications which are easier to maintain and extend.

One example of an environment or system 100 for storing spectroscopy data in layers is shown in FIG. 1, which can include a spectroscopy sensor or sensor 102 for generating raw data. The sensor may be an instrument such as a spectrometer that can be employed to identify an object or target. Spectroscopy studies the interaction between matter and electromagnetic energy, such as a light. The interaction may be used to identify the type of matter. For example, the light may be a transmitted to a surface of the object, incident light on the surface of the object can then be reflected off of the surface of the object or generate other electromagnetic properties that can be detected by a detector, for example, which is a part of the sensor as a whole.

The incident light may be changed once it is reflected off the surface of the object. The change may be used to classify the type of matter that the object is composed of. The sensor 102 may be an instrument that employs any type of spectrometer and spectroscopy including, but not limited to, electromagnetic radiation spectroscopy, acoustic spectroscopy, mechanical spectroscopy, surface-enhanced Raman spectroscopy (SERS), surface-enhanced fluorescence (SEF), other types of luminescent spectroscopy, etc.

The sensor 102 may comprise a plurality of components. For example, one component may be an electromagnetic radiation generating device such as a light emitting diode (LED) or other light source. Another component may be a detector that can be capable of detecting the light reflected off a surface of the object. The detector may generate raw data related to the reflected light including the wavelength (nm) and intensity (counts) of the reflected light. In SERS and other spectroscopy techniques, the reflected light may be referred to as photons that have been reflected of the surface of a nanostructure.

Data generated by the sensor 102 may be referred to as raw data or spectroscopy data. The raw data may be temporarily stored by a storage component associated with the sensor. Alternatively, the sensor may have no storage component and provides a feed or stream of the raw data to a processor 104 or a storage location.

Table 1 shows example raw data providing wavelength versus intensity of light that may be generated by the sensor 102. Wavenumber determined as well based on the reciprocal of wavelength ($cm^{-1}$). Intensity can be quantified using counts of an arbitrary scale. The raw data in Table 1 may be referred to as a spectrum.

TABLE 1

| Wavelength (nm) | Intensity (counts) |
|---|---|
| 1671.495728 | 1300.705933 |
| 1670.655884 | 1321.541016 |
| 1669.815063 | 1297.483154 |
| 1668.975220 | 1329.965576 |
| 1668.134399 | 1261.294434 |

Table 1 depicts five rows of raw data. It should be appreciated that a spectrum for an object being tested by a spectrometer may contain several hundred rows of data that pair wavelength and intensity. Intensity is based on counts.

The processor 104 can be capable of processing the raw data generated by the sensor 102 and storing the resulting data in an array data model. For example, the processor may process the raw data in stages with intermediate stages. Initial stages may process raw data obtained from the sensor while later stages process intermediate data produced by the initial stages. This multi-stage data processing environment stores intermediate data at various stages. Individual data stages may have an implicit link, generated by the processor, to the data of the previous stage (used as input), ultimately linking back to the raw data.

Figure 5:
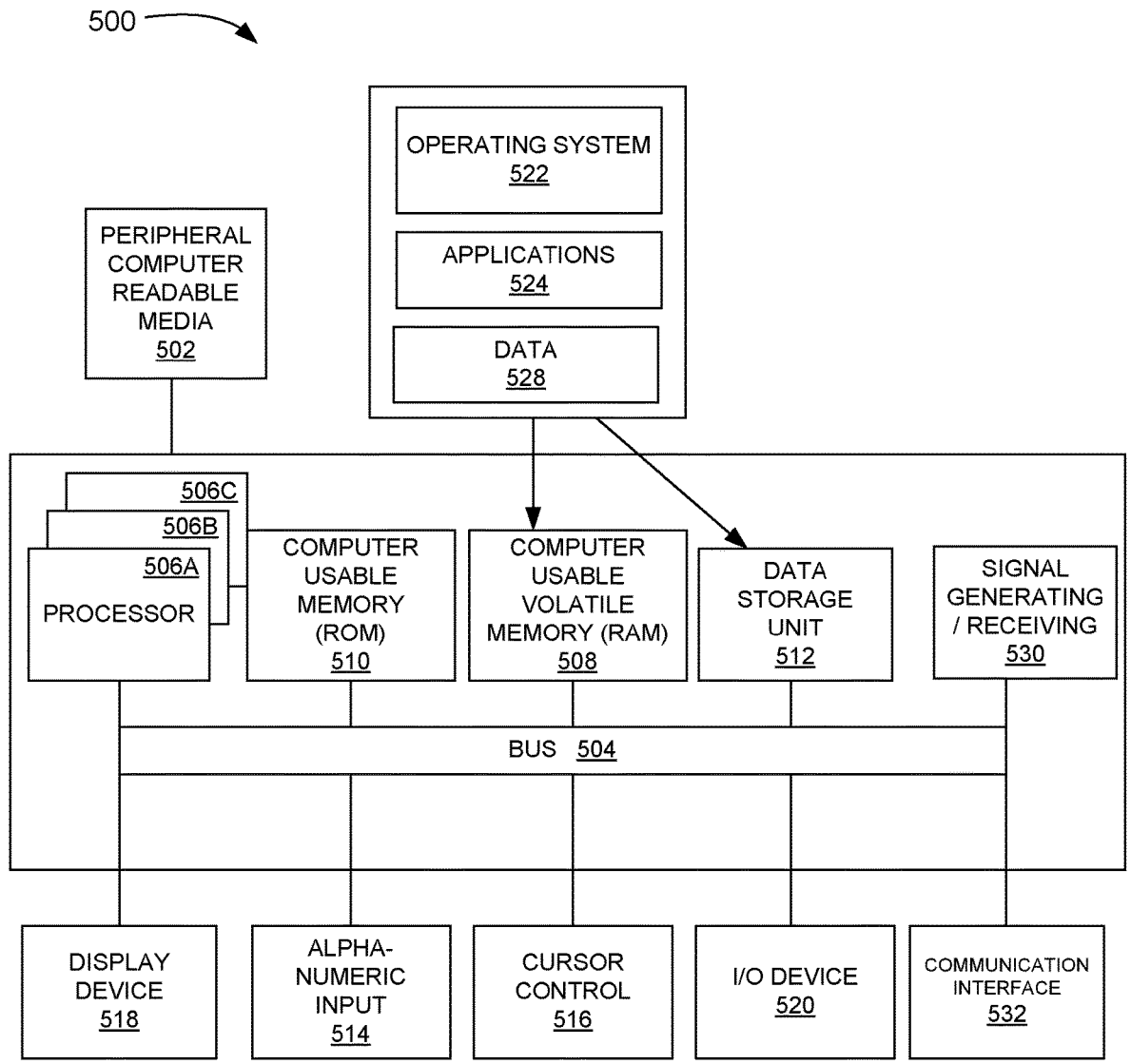
FIG. 5 is a block diagram of an example computing system in accordance with the present disclosure.

The processor 104 may be a hardware device that is an electrical circuit that performs operations on a data from a data source such as the sensor 102. The processor may be any type of processor including but not limited to a central processing unit, a microprocessor, an application-specific instruction set processor, a graphic processing unit, etc. The processor may be a component of the sensor or may be separate from the sensor. The processor may be physically close or adjacent to the sensor or may be physically remote to the sensor. The processor may receive raw data from the sensor via a hard line or via wireless transmissions. The processor may be connected to the sensor via a network. In one example, the processor is connected to a plurality of sensors that generate raw data related to one or more objects. The processor may be a component of a larger computer system such as what is depicted in FIG. 5, or some other larger computer system, for example.

In one example, the processor 104 processes the raw data from the sensor 102 and stores the results in a multi-dimensional array. The multi-dimensional array can be capable of storing data from the various stages of the processing while the implicit data links between the stages can be maintained and stored. For example, the array data model with the multi-dimensional array can be stored in a database 106.

The database 106 may be stored in persistent storage. The persistent storage may be a hardware device such as a hard disk drive, a solid-state drive, or other storage device. The persistent storage may be a component of the same computer system that the processor 104 is part of. The persistent storage may be part of a computer system that is separate from the processor. The processor may communicate with the database via a network. In one example, the database may be stored over more than one physical storage devices. Cloud computing techniques may be employed to store and access the database.

The database 106 may be used to store the multi-dimensional array where the number of dimensions may be any number of dimensions. In one example, the dimensions include acquisition data, sensor data, index data, and layer data. The multi-dimensional array may include additional dimensions with data related to a wafer or wafer type for an instrument such as a spectrometer, a sensor or detector location on the wafer, a sensor location on a spectrometer tray, a spectrometer or spectrometer type, an analyte, or a reagent. The array data model may be scalable by expanding to store data in more than one persistent storage location.

The array data model allows the data stored in the database 106 to be accessed via an Application Programming Interface (API). The API may be described as a set of subroutine definitions, protocols, and tools for building application software. The API may be a set of clearly defined methods of communication between various software components. A developer of an application may use the API to build the application software where the application software will be installed and executed a user device and the application software accesses the data in the database. An API for the database may allow unique access to the data in the multi-dimensional array as compared data stored in a relational database. The developer may build an application that accesses one layer or dimension of the data in the database or slice across layers to access data. For example, the developer may employ the API to have the application access intermediate data that is generated during the multi stage data processing of the raw data by the processor 104.

Figure 2:
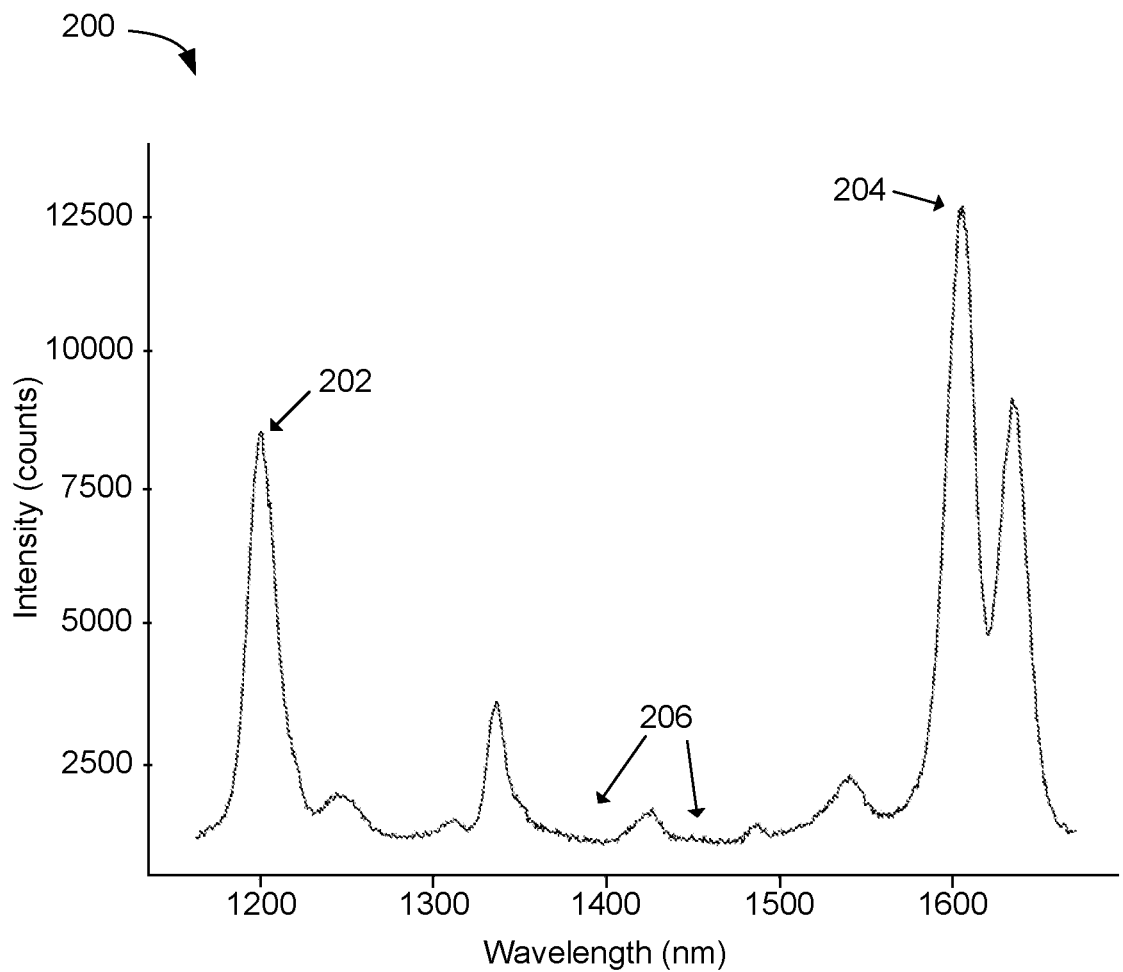
FIG. 2 is a graph of an example raw data associated with wavelength data versus intensity of measured light in accordance with the present disclosure.

FIG. 2 depicts a graph 200 of data that has been generated by an instrument such as a spectrometer. A portion of the graph may represent the spectrum of raw data from Table 1, e.g., raw data generated using SERS. The graph specifically depicts raw data related to electromagnetic radiation such as a light. The vertical axis of the graph represents the intensity of the electromagnetic radiation while the horizontal axis represents the wavelength of the electromagnetic radiation.

The graph 200 depicts peaks and background of the raw data. For example, peak 202 and peak 204 are two examples of peaks in the raw data while background 206 depicts a portion of the background depicted in the graph. The spectrum of the graph may include data obtained from multiple acquisitions for the same object made using the same sensor such as the spectroscopy sensor (or sensor) 102 of FIG. 1. The wavelength numbers may be floating point numbers. The peaks (202, 204) and the background may be used to identify or classify the object. Before the object is identified, the data for the peaks and the background may be processed to reduce noise and anomalies and to further define the location of the peaks. The multi stage data processing described above may be employed to process the spectrum of the graph. Various libraries with various settings can be used to process the peaks of a spectrum. Background intensity and background adjusted intensities can be computed. Intensities at specific wavelength numbers can be treated as peaks and background adjusted intensities can be used to compute relative peaks.

Figure 3:
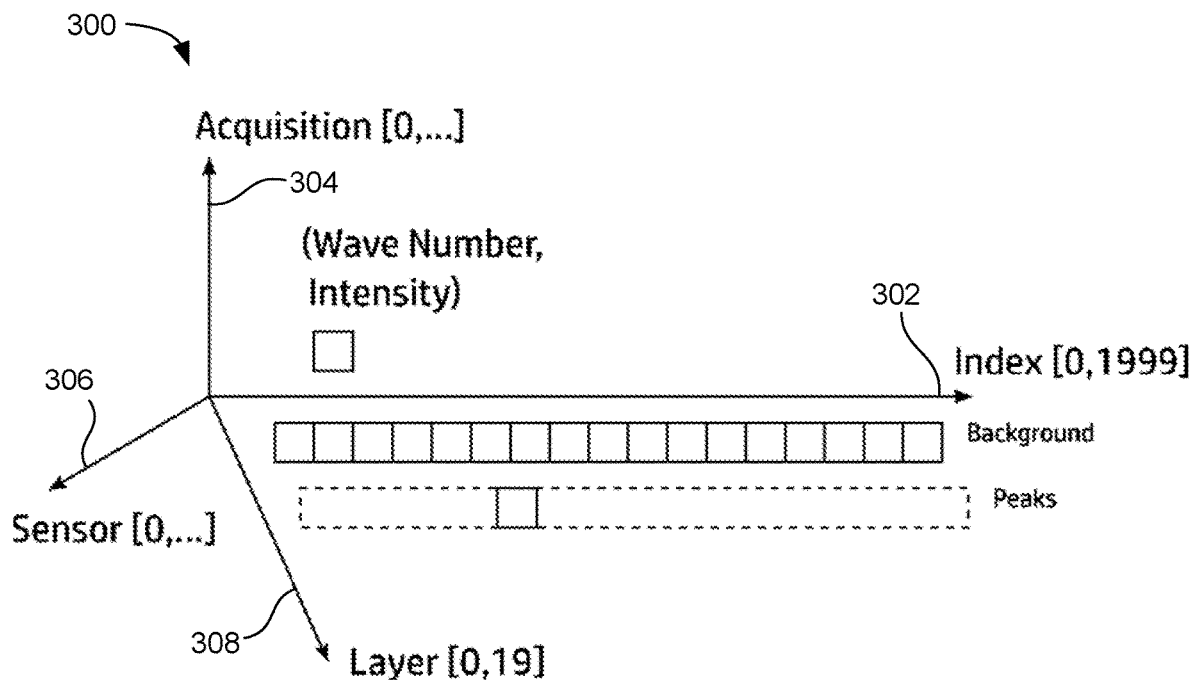
FIG. 3 is a block diagram of an example multi-dimensional array in an array data model in accordance with the present disclosure.

FIG. 3 depicts an array data model 300 with layer dimensions. A spectrum, such as the spectrum depicted by graph 200 of FIG. 2 and Table 1, may be modeled as a set of points in four-dimensional space. Individual cells of data may contain the two attributes wavelength number and intensity. The dimensions may be index, acquisition, layer, and sensor data, for example.

The index data can be depicted as dimension 302 and may capture all the points in the spectrum. For example, if the spectrum has 500 points, the index can run from 0 to 499. The dimension range may be 0 to 1,999 (2,000 values). The acquisition data can likewise be depicted as dimension 304 and can capture multiple acquisitions for the same sensor. The dimension range may be 0 to infinite (unbound). The sensor data can be depicted as dimension 306 and may capture data from multiple sensors or multiple sensor locations used for different spectra. This dimension range may be 0 to infinite (unbound). The layer data can be depicted as dimension 308 and can capture background, background-adjusted intensities, peaks computed in various ways, and/or additional points associated with the peaks. This dimension range may be 0 to 19 (20 values). Other values may be use other than the examples values provided in FIG. 3.

The array data model 300 depicts how peaks can be stored by copying the data points which correspond to peaks (i.e., wavelength number and intensity pairs) on the layer dimension. The layer names may be stored in a separate one-dimensional array. The cells of this array may contain one attribute of type string which stores the name of the layer. The dimension may be the same as the layer dimension defined for the spectrum array. The spectrum array and the layer array can be joined on the layer dimension to obtain both spectrum and layer names in the same array.

In one example, the data model contains a few dimensions and some of them can be unbounded. Moreover, there may be redundant data in this data model (e.g., wavelength numbers for acquisitions, pairs of wavelength numbers and intensities for peaks, etc.).

Figure 4:
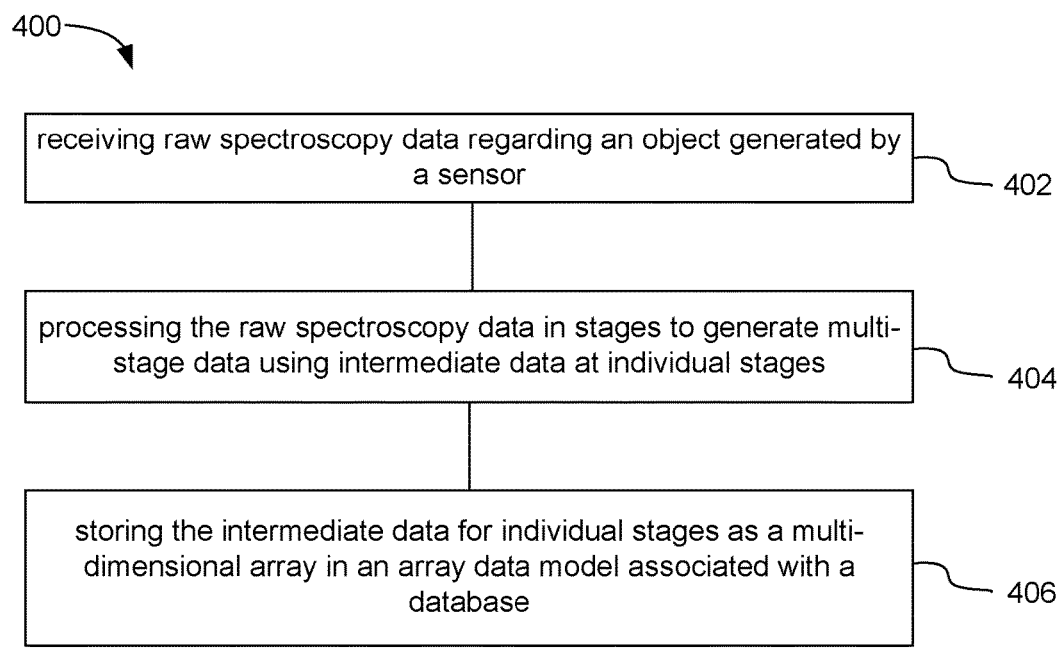
FIG. 4 is a flow chart of an example method for storing spectroscopy data in layers in accordance with the present disclosure.

FIG. 4 is a flowchart of an example method 400 for storing spectroscopy data in layers. The method can be carried out in part or in full by processors and/or electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one example, method 400 can be performed by devices in FIGS. 1 and/or 5. For example, stages 402-406 may be carried out by the sensor 102, the processor 104, and the database 106 of FIG. 1, and implemented on a computing system environment as shown in FIG. 5, or other system.

The method can include receiving 402 raw spectroscopy data regarding an object generated by a sensor. For example, the sensor may be an instrument such as a spectrometer that generates the raw spectroscopy data including the wavelength and intensity of light or other electromagnetic radiation. The raw spectroscopy data may be generated using SERS techniques. The raw spectroscopy data may for a spectrum.

The method can further include processing 404 the raw spectroscopy data in stages to generate multi-stage data using intermediate data at individual stages. The processing may be accomplished using the processor 104 of FIG. 1. The multi-stage processing may be employed to further refine the peaks and background of the spectrum of raw data to identify or classify the object.

The method can further include storing 406 the intermediate data for individual stages as a multi-dimensional array in an array data model associated with a database. The multi-dimensional array and the array data model allow the data to be stored in layers and to be accessed faster as compared to a relational database. The array data model may be scaled as the amount of data is increased. The multi-dimensional array can include acquisition data, sensor data, index data, and layer data. The multi-dimensional array may include additional dimensions with data related to a wafer or wafer type for an instrument such as a spectrometer, a sensor or detector location on the wafer, a sensor location on a spectrometer tray, a spectrometer or spectrometer type, an analyte, or a reagent. The array data model may store data from a plurality of sensors, analyses, reagents, spectrometers, and/or wafers.

The method may further include making the data in the array data model available via an API. The API may allow an application to access a layer of data or a slice of data across all layers.

An example computer system environment is shown in FIG. 5, with portions providing a communication pathway composed of non-transitory computer-readable and computer-executable instructions that reside, for example, in computer-usable media of a computer system. That is, FIG. 5 illustrates one example of a type of computer that can be used to implement examples of the present disclosure.

More specifically, FIG. 5 illustrates an example computer system 500 used in accordance with examples of the present disclosure. It is appreciated that system 500 is an example only and that the present disclosure can operate on or within a number of different computer systems including general purpose networked computer systems, embedded computer systems, routers, switches, server devices, user devices, various intermediate devices/artifacts, standalone computer systems, mobile phones, personal data assistants, televisions and the like. As shown in FIG. 5, computer system 500 can be adapted to having peripheral computer readable media 502 such as, for example, a floppy disk, a compact disc, a hard drive, a solid-state drive, magnetic media, or the like, coupled thereto.

System 500 can include an address/data bus 504 for communicating information, and a processor 506A coupled to bus 504 for processing information and instructions. This system can also be well suited to a multi-processor environment in which a plurality of processors 506A, 506B, and 506C are present. Conversely, system 500 can also be suited to having a single processor such as, for example, processor 506A. Whether a single processor or multiple processors, they may be referred to collectively as "processor(s) 506A, 506B, and/or 5060," for example. Processors 506A, 506B, and/or 506C may be any of various types of microprocessors. The system can also include data storage features such as a computer usable volatile memory 508, e.g. random access memory (RAM), coupled to bus 504 for storing information and instructions for processors 506A, 506B, and/or 506C.

System 500 can also include computer usable non-volatile memory 510, e.g. read only memory (ROM), coupled to bus 504 for storing static information and instructions for processor(s) 506A, 506B, and/or 506C. Also present in system 500 is a data storage unit 512 (e.g., a magnetic or optical disk and disk drive) coupled to bus 504 for storing information and instructions. The system can also include an alpha-numeric input device 514 including alphanumeric and function keys coupled to bus 504 for communicating information and command selections to processor(s) 506A, 506B, and/or 506C.

System 500 of the present example may also include a display device 518 coupled to bus 504 for displaying information. The display device can be, for example, a liquid crystal device, cathode ray tube, plasma display device or other display device suitable for creating graphic images and alpha-numeric characters recognizable to a user. A cursor control device 516 can also be present can be coupled to bus 504 for communicating user input information and command selections to processor(s) 506A, 506B, and/or 506C, for example. The cursor control device may allow the computer user to dynamically signal the movement of a visible symbol (cursor) on a display screen of the display device. Many implementations of cursor control devices can be used, including a trackball, mouse, touch pad, joystick or special keys on alpha-numeric input device 514 capable of signaling movement of a given direction or manner of displacement. Alternatively, it will be appreciated that a cursor can be directed and/or activated via input from the alpha-numeric input device using special keys and key sequence commands.

System 500 can be suited to having a cursor directed by other means such as, for example, voice commands. System 500 can also include an I/O device 520 for coupling system 500 with external entities. For example, in one example, the I/O device can be a modem for enabling wired or wireless communications between the system and an external network such as, but not limited to, the Internet.

Referring still to FIG. 5, an operating system 522, applications 524, and data 528 are shown as typically residing in one or some combination of computer usable volatile memory 508, e.g. random access memory (RAM), and/or the data storage unit 512. However, it is appreciated that in some examples, the operating system may be stored in other locations such as on a network or on a flash drive; and that further, the operating system may be accessed from a remote location via, for example, a coupling to the internet. In one example, the present disclosure, for example, is stored as an application in memory locations within RAM and memory areas within the data storage unit. The present disclosure may be applied to one or more elements of described system 500. For example, a method of physical proximity security may be applied to operating system, applications, and/or data.

System 500 also includes one or more signal generating and receiving device(s) 530 coupled with bus 504 for enabling the system to interface with other electronic devices and computer systems. Signal generating and receiving device(s) of the present example may include wired serial adaptors, modems, and network adaptors, wireless modems, and wireless network adaptors, and other such communication disclosure. The signal generating and receiving device(s) may work in conjunction with one or more communication interface(s) for coupling information to and/or from the system. The communication interface may include a serial port, parallel port, Universal Serial Bus (USB), Ethernet port, antenna, or other input/output interface. Furthermore, the communication interface may physically, electrically, optically, or wirelessly (e.g. via radio frequency) couple system with another device, such as a cellular telephone, radio, or computer system.

The computing system 500 is one example of a suitable computing environment and is not intended to suggest any limitation as to the scope of use or functionality of the present disclosure. Neither should the computing environment be interpreted as having any dependency relating to any one or combination of components illustrated in the example computing system.

The present disclosure may be described in the general context of non-transitory computer-executable instructions, such as programs, being executed by a computer. Generally, programs include applications, routines, objects, components, data structures, etc., that perform particular tasks or implement particular abstract data types. The present disclosure may also be practiced in distributed computing environments where tasks are performed by remote processing devices that are linked through a communications network. In a distributed computing environment, programs may be located in both local and remote non-transitory computer-storage media including memory-storage devices.

What is claimed is:

1. A system to store spectroscopy data in layers, comprising:
   a sensor to generate raw spectroscopy data from an object;
   a processor to process the raw spectroscopy data in stages to generate multi-stage data using intermediate data at individual stages; and
   a database to store the intermediate data for the individual stages as a multi-dimensional array in an array data model.

2. The system of claim 1, wherein the sensor is a spectrometer and the raw spectroscopy data is generated using luminescence-enhanced spectroscopy.

3. The system of claim 1, wherein data stored in the array data model is made available via an application programming interface (API).

4. The system of claim 1, wherein dimensions of the multi-dimensional array include acquisition data, sensor data, index data, and layer data.

5. The system of claim 1, wherein the array data model stores the raw spectroscopy data with the intermediate data.

6. The system of claim 1, wherein the array data model stores data from a plurality of sensors, analyses, reagents, spectrometers, wafers, or combinations thereof.

7. A method for storing spectroscopy data in layers, comprising:
   receiving raw spectroscopy data regarding an object generated by a sensor;
   processing the raw spectroscopy data in stages to generate multi-stage data using intermediate data at individual stages; and
   storing the intermediate data for individual stages as a multi-dimensional array in an array data model associated with a database.

8. The method of claim 7, wherein the sensor is a spectrometer and the raw spectroscopy data is generated using luminescence-enhanced spectroscopy.

9. The method of claim 7, wherein data stored in the array data model is made available via an application programming interface (API).

10. The method of claim 7, wherein dimensions of the multi-dimensional array include acquisition data, sensor data, index data, and layer data.

11. The method of claim 7, wherein the array data model stores the raw spectroscopy data with the intermediate data.

12. The method of claim 7, wherein the array data model stores data from a plurality of sensors, analyses, reagents, spectrometers, wafers, or combinations thereof.

13. A non-transitory machine-readable storage medium having instructions embodied thereon, the instructions when executed cause a processor to perform storing spectroscopy data in layers, comprising:
   receiving raw spectroscopy data regarding an object generated by a sensor;
   processing the raw spectroscopy data in stages to generate multi-stage data using intermediate data at individual stages; and
   storing the intermediate data for individual stages as a multi-dimensional array in an array data model associated with a database.

14. The non-transitory machine-readable storage medium of claim 13, wherein data stored in the array data model is made available via an application programming interface (API).

15. The non-transitory machine-readable storage medium of claim 13, wherein dimensions of the multi-dimensional array include acquisition data, sensor data, index data, and layer data.

* * * * *